(12) United States Patent
Luo et al.

(10) Patent No.: US 11,474,484 B2
(45) Date of Patent: Oct. 18, 2022

(54) METHOD FOR TRAINING VIRTUAL ANIMAL TO MOVE BASED ON CONTROL PARAMETER

(71) Applicants: Inventec (Pudong) Technology Corporation, Shanghai (CN); INVENTEC CORPORATION, Taipei (TW)

(72) Inventors: Ying-Sheng Luo, Taipei (TW); Jonathan Hans Soeseno, Taipei (TW); Trista Pei-Chun Chen, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 182 days.

(21) Appl. No.: 17/132,101

(22) Filed: Dec. 23, 2020

(65) Prior Publication Data

US 2022/0083012 A1   Mar. 17, 2022

(30) Foreign Application Priority Data

Sep. 14, 2020   (CN) .......................... 202010961867.9

(51) Int. Cl.
*G05B 13/02* (2006.01)
*G06N 20/00* (2019.01)

(52) U.S. Cl.
CPC ......... *G05B 13/0265* (2013.01); *G06N 20/00* (2019.01)

(58) Field of Classification Search
CPC .......................... G05B 13/0265; G06N 20/00
USPC ............ 318/568.12, 568.11, 568.1, 567, 560
See application file for complete search history.

(56) References Cited

U.S. PATENT DOCUMENTS 9,031,714 B1 *   5/2015   Everett ................... G06F 9/451
701/2

\* cited by examiner

*Primary Examiner* — David Luo
(74) *Attorney, Agent, or Firm* — Locke Lord LLP; Tim Tingkang Xia, Esq.

(57) ABSTRACT

A method for training a locomotion controller of a robotic animal comprising obtaining a motion data of a reference animal, an environmental parameter, and a disturbance parameter; generating a plurality of primitive distributions and a first primitive influence according to the motion data by a policy network; selecting a current state of the reference animal from the motion data and set an adapting state of the reference animal; generating a second primitive influence, by the policy network, according to the current state, the adapting state, and the plurality of primitive distributions at least; and training the policy network according to a result determined by a discriminator according to the first primitive influence and the second primitive influence.

6 Claims, 4 Drawing Sheets

METHOD FOR TRAINING VIRTUAL ANIMAL TO MOVE BASED ON CONTROL PARAMETER

CROSS-REFERENCE TO RELATED APPLICATIONS

This non-provisional application claims priority under 35 U.S.C. § 119(a) on Patent Application No(s). 202010961867.9 filed in China on Sep. 14, 2020, the entire contents of which are hereby incorporated by reference.

BACKGROUND

1. Technical Field

This disclosure relates to motion synthesis and character animation, and more particularly to a method for training a virtual animal to move based on control parameters.

2. Related Art

Designing agile locomotion skills for quadruped robots remains a challenging problem. Classical approaches often require extensive experience on robotic domain knowledge and tedious parameter. Due to the fact that constantly falling during experiments may permanently damage the hardware facility and make the entire system unstable. Therefore, learning in the physical simulator seems to be the most reasonable method, because this method is fast, safe and cheap.

Recently, Deep Reinforcement Learning (DRL) has been shown tremendous progress on solving locomotion problems. Compare with learning skills from model-based methods which require prior knowledge of true physical dynamics, DRL can learn various skills through trial-and-error and thus reduce the needs of human involvements. Many of the optimization techniques used to develop controllers for simulated characters are based on reinforcement learning.

However, as far as the virtual robotic quadruped is concerned, the behavior obtained through DRL still does not look more natural than the behavior obtained through artificial design. Part of the challenge stems from the difficulty in specifying reward functions for natural movement, particularly in the absence of biomechanical models and objectives that can be used to achieve natural simulated locomotion. With all the efforts in crafting realistic motions in the synthesized world, or in the simulation, in robotics, policies trained in simulation often do not transfer to the real world.

SUMMARY

Accordingly, the present disclosure provides a method for training a locomotion controller of a robotic animal so that the controller configured to controls the locomotion of the virtual animal may be adapted to the robotic animal in real world.

According to one or more embodiment of the present disclosure, a method for training a locomotion controller of a robotic animal comprising: obtaining a motion data of a reference animal, an environmental parameter, and a disturbance parameter; generating a plurality of primitive distributions and a first primitive influence according to the motion data by a policy network; selecting a current state of the reference animal from the motion data and set an adapting state of the reference animal; generating a second primitive influence, by the policy network, according to the current state, the adapting state, and the plurality of primitive distributions at least, wherein, in response to the environmental parameter and the disturbance parameter, a state of the reference animal is converted from the current state to the adapting state; and training the policy network according to a result determined by a discriminator according to the first primitive influence and the second primitive influence.

In view of the above description, the method for training the locomotion controller of the robotic animal proposed by the present disclosure adding the augmentation parameters applicable to each of actuator models, robot mechanical limits, sensor noises, environmental change, inference engine delay, and microcontroller delay during the training process, and thereby training a robust controller. This controller is not only suitable for the virtual animal in character animation, but also can be directly integrated into the physical robotic animal, and high-level instructions are available to control the locomotion of the physical robotic animal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure proposes a method for training a locomotion controller of a robotic animal. Regarding a controller which controls the locomotion of the virtual animal, the present disclosure augments input parameters and output parameters during the training of this controller, and thus generating a robust controller adapted to a physical robotic quadruped. The robust controller generated by the present disclosure is also adapted to the virtual animal.

Figure 1:
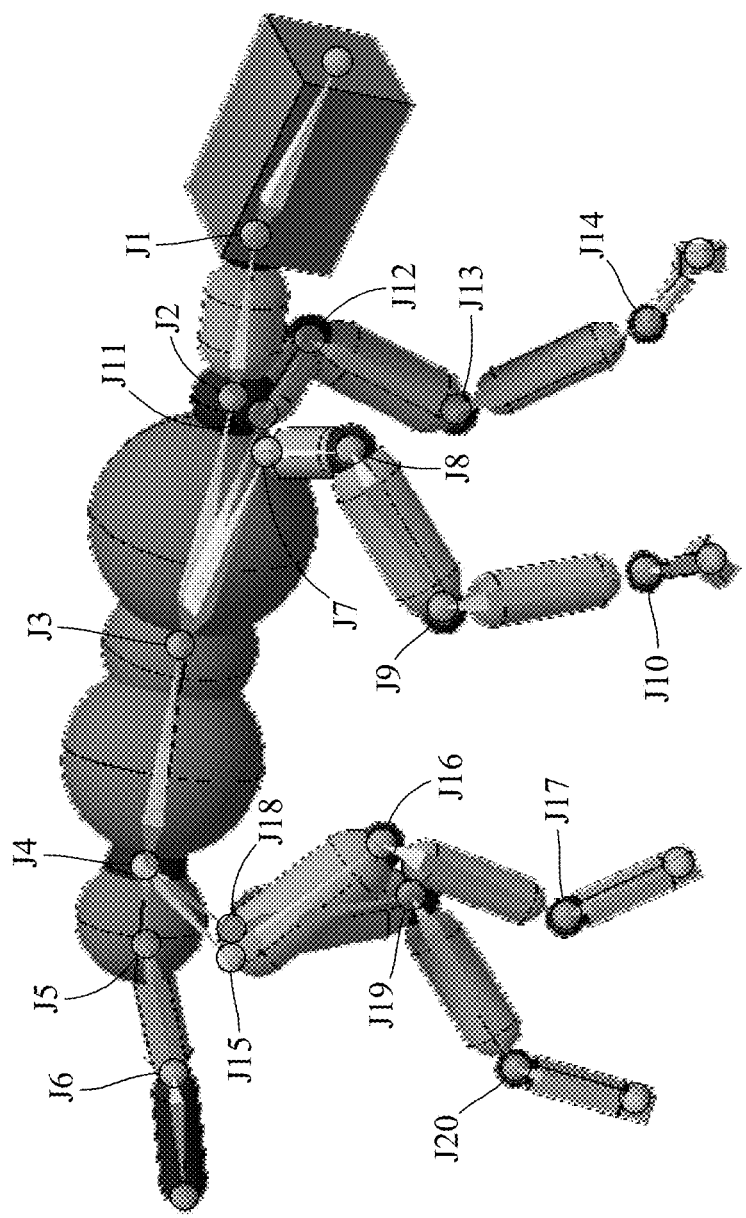
FIG. 1 is a schematic diagram of the robotic animal.

FIG. 1 is a schematic diagram of the robotic animal. The robotic animal comprises a plurality of joints as shown in FIG. 1. The robotic quadruped of FIG. 1 has 20 joints J1-J20, and each joint may be installed a motor. The controller trained according to the present disclosure is configured to provide a rotation momentum to each motor so that each motor may generate a torque, and then drives the robotic animal to move.

Figure 2:
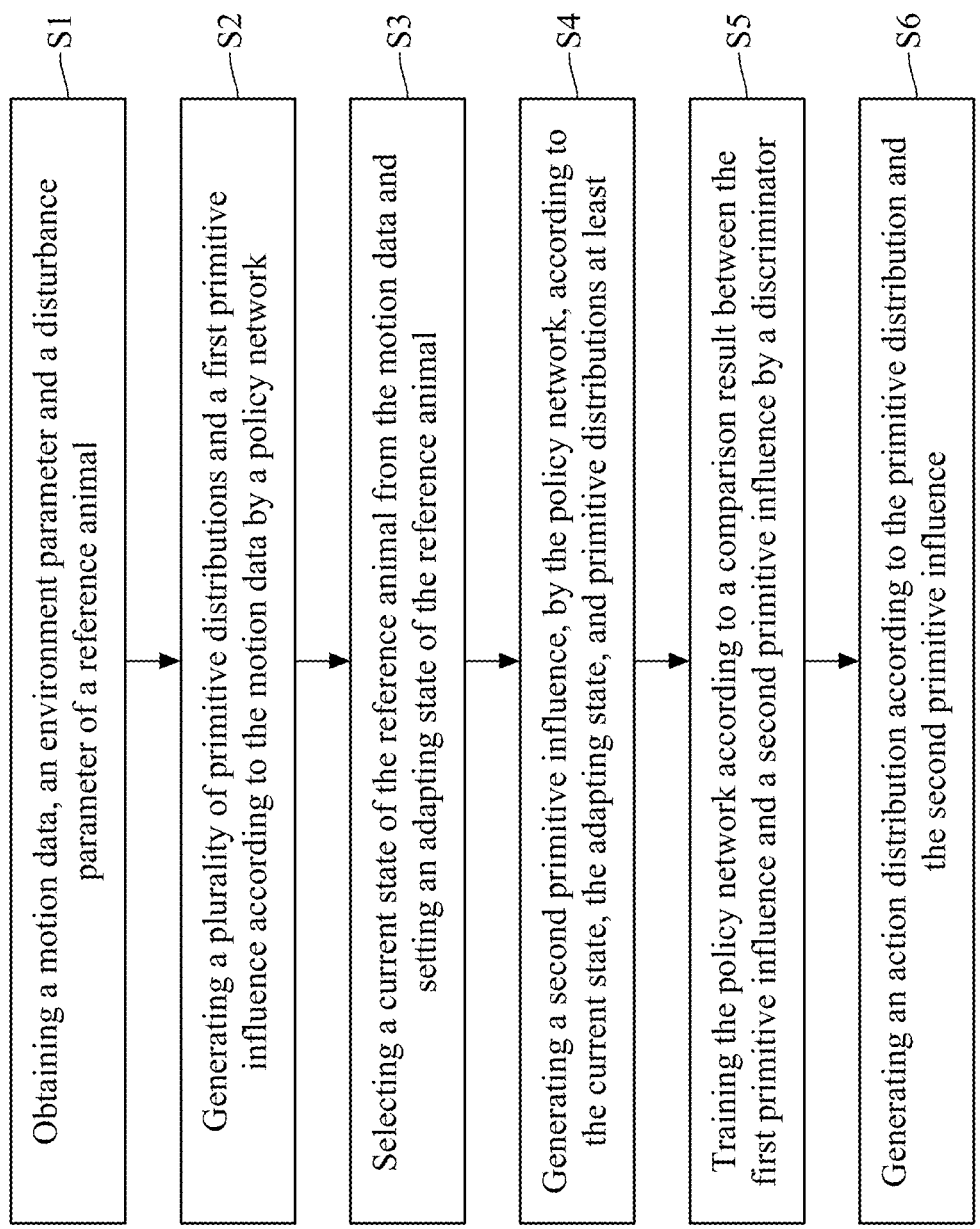
FIG. 2 is a flow chart of the method for training a locomotion controller of a robotic animal according to an embodiment of the present disclosure.

FIG. 2 is a flow chart of an embodiment of the present disclosure and comprises steps S1-S5. Step S1 shows "obtaining a motion data, an environment parameter and a disturbance parameter of a reference animal". The reference animal refers to anything that lives and moves. The reference animal is a real version of the virtual animal, such as dog. The motion data comprises a plurality of state information of the reference animal in a period of time such as 10 seconds. Each state information comprises measured data such as position, velocity, rotation, and angular velocity. All the measured data are represented as 3-dimensional vector except for the rotations, which are represented as 4-dimensional quaternions.

In an embodiment of the present disclosure, the motion data obtained in step S1 comprises a current state and a historical state. After obtained the motion data including the current state, the present disclosure further comprises a step to store the current state in an input queue. In other words, the input queue according to said embodiment of the present disclosure may store all state information of the reference animal in a period of time. Therefore, not only the current state of the reference animal may be used during the training process, but also the historical state of the reference animal may be used during the training process.

Figure 3:
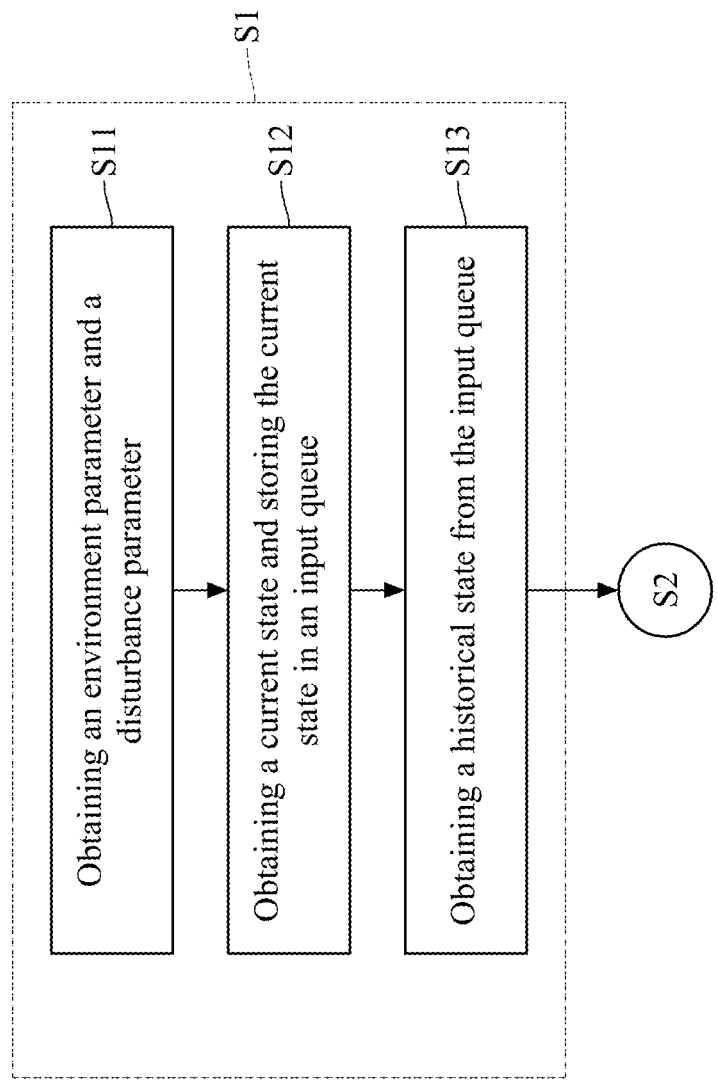
FIG. 3 is a detailed flow chart of step S1 of FIG. 1.

FIG. 3 is a detailed flow chart of step S1 of FIG. 1. FIG. 3 shows that step S1 comprises steps S11-S13.

Step S11 shows "obtaining an environment parameter and a disturbance parameter". Step S12 shows "obtaining a current state and storing the current state in an input queue". Step S13 shows "obtaining a historical state from the input queue".

Specifically, steps S11-S13 considers delays from the inference engine and the microcontroller. In further another embodiment of the present disclosure, in addition to storing the state information of the reference animal in the input queue, the historical information of the proportional-derivative (PD) controller is also stored in the input queue. During the training progress, the policy network receives the historical state queried from the input queue based on the given inference latency, and the PD controller also received delayed control information from the input queue based on the given PD latency. For example, an embodiment of the present disclosure sets the latency of inference engine and PD controller to 15 milliseconds and 2 milliseconds respectively, and increases the control frequency of the policy network from 30 Hz to 200 Hz for better system stability and agility. Therefore, the current state, the historical state 15 milliseconds ago, the PD control parameters 2 milliseconds ago, the environment parameter and the disturbance parameter can be obtained in step S1. Each of the environment parameter and the disturbance parameters may also comprise a current information and a historical information of its own, and the present disclosure does not limit thereof.

In an embodiment of the present disclosure, the environment parameter comprises a velocity data and a heading data of the reference animal in a specific environment. For example, considering a scenario that a reference animal walks in a straight line and the road having potholes in the environment, the forward direction of the reference animal changes from 12 o'clock to 9 o'clock at the i-th second, and the forward speed changes from 2 meters per second to 1.5 meters per second. The numbers in the above description are examples of environmental parameters. However, numbers and actions of the above description are not intended to limit the present disclosure. In practice, in order to make the robotic animal or the virtual animal adapt to various scenarios, the number of training samples of environment parameters can be increased.

In an embodiment of the present disclosure, "obtaining the motion data" can be implemented by setting a plurality of sensors on the body of a real-world animal to collect the motion data. Another implementation of step S11 is to obtain motion data through physics engine simulation. The present disclosure does not limit the way of obtaining the motion data.

In another embodiment of the present disclosure, the environment parameter comprises a heightmap of the environment where the reference animal locates. In view of the difference between the real environment and the simulated environment, the present disclosure considers a special case of terrain change through this environment parameter.

In general, most of the reference motions of the reference animal were sampled on flat terrain. The present disclosure considers irregular environments and augments the policy network with a heightmap input.

Depending on the types of environments, the heightmap is sampled on a 2-dimensional uniform grid around the character for the hill environment and the size of heightmap is 32*32. The heightmap is sampled on a 1-dimensional line starting from the place where the character is landed for the stair environment, and the size of heightmap is 100. The stair environment described above in single direction. If the environment does not limit the type of stairs, the present disclosure may use a 2-dimensional heightmap. The present disclosure does not particularly limit the heightmap format that should be used in various scenarios.

Figure 4:
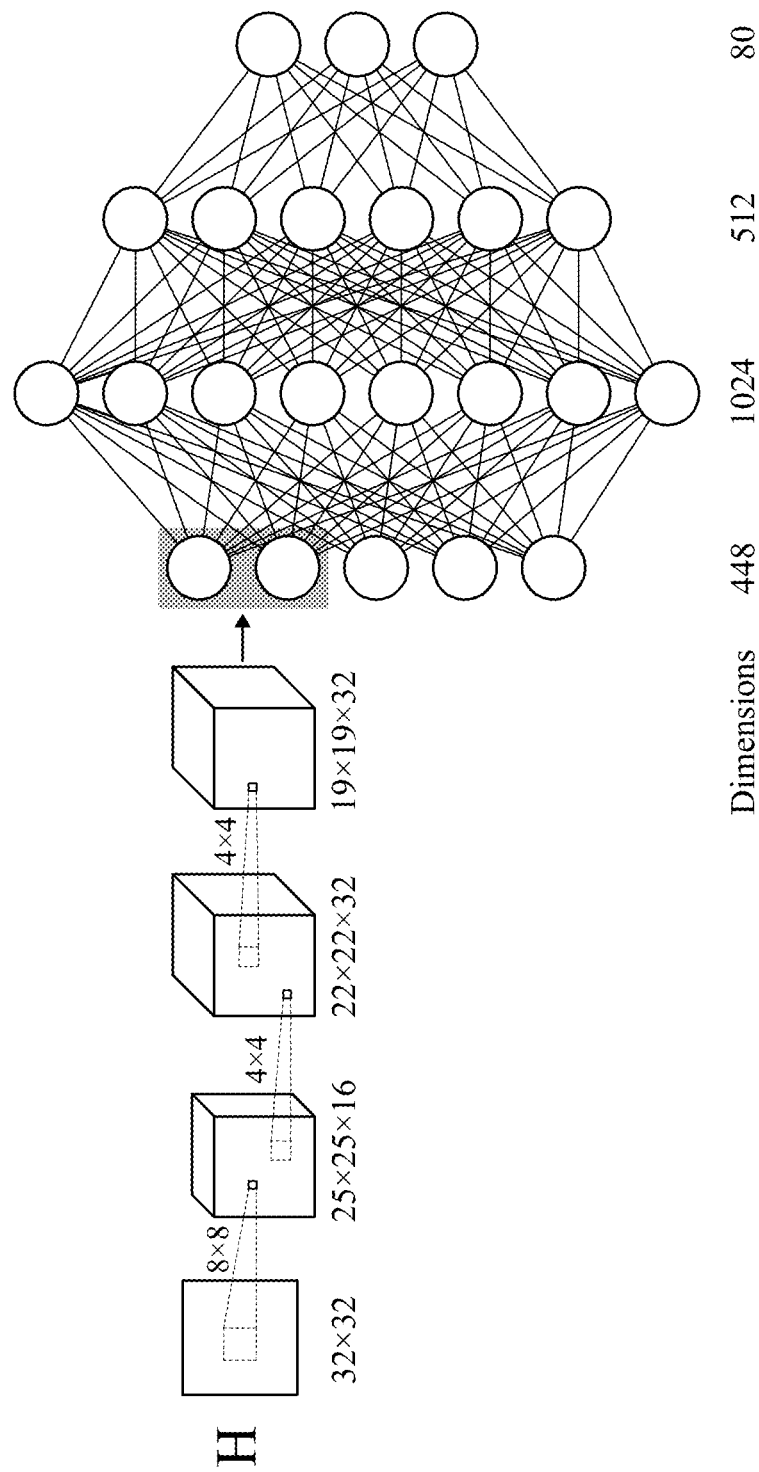
FIG. 4 is a schematic diagram of the policy network of augmented heightmap.

FIG. 4 is a schematic diagram of the policy network of augmented heightmap. The heightmap is first processed by 3 convolution layers with 16 8×8 filters, 32 4×4 filters, and 32 4×4 filters. The feature maps are then flattened by a fully-connected layer with 64 units, followed by concatenating with the input state processed by two fully-connected layer with 1024 and 512 units. The Rectified Linear Unit (ReLU) activations are used for all hidden layers.

To facilitate faster training, an embodiment of the present disclosure adopts a progressive learning mechanism (or a warm-start strategy), where the policy network has been initialized by a trained model on the flat terrain (without the heightmap inputs), and then the heightmap is augmented in the training process.

In another embodiment of the present disclosure, the environment comprises ground-surface varieties with friction coefficients.

In an embodiment of the present disclosure, the disturbance parameter comprises a Gaussian noise applied on the PD controller. Specifically, the actuator model of the robotic animal is drove by positional control through PD controllers. In reality, the torque gains may saturate as the current increases. This is because the linear torque-current relation only holds for ideal motors. To eliminate the model discrepancy for actuators, the present disclosure applies Gaussian noises multiplied by torques output from PD controllers to emulate the effect of varying motor strengths in simulation. Given such augmentation, the robotic animal can still perform skills closed enough to the original one even after varying the motor strengths.

In another embodiment of the present disclosure, the disturbance parameter comprises an external force applied on one of the plurality of joints and a direction of the external force. For example, the disturbance parameters for the back joint J3 of a robotic animal comprise 50-100 N (Newton) of external force, 9 o'clock direction, and 0.5 seconds of lasting period. These example values can be randomly generated or manually specified, and the present disclosure does not limit how to generate these values. In real world, the state of robotic animal is measured by sensors. Considering the effect of robot joint mechanical limitations and defects, and sensor noises, it is necessary to augment the real sensor input into the controller trained according to the present disclosure. By means of "augmenting" the ideal sensor input to the inference engine, the present disclosure increases the robustness of the controller. The robustness of the trained controller of the robotic animal can be measured by how well the simulated character can handle external perturbations and generate plausible recovery behaviors against external forces.

Please refer to FIG. 2. S2 shows "generating a plurality of primitive distributions and a first primitive influence according to the motion data by a policy network". In step S2, an embodiment of the present disclosure adopts a policy network described in the following document, "Xue Bin Peng, Michael Chang, Grace Zhang, Pieter Abbeel, and Sergey Levine. 2019. MCP: Learning Composable Hierarchical Control with Multiplicative Compositional Policies. In NeurIPS".

The policy network of the above document comprises a primitive network and a gating network. The primitive network is configured to generate primitive distributions according to the motion data, and the gating network is configured to generate a plurality of first primitive influences according to the current state and the target state of the reference animal. In an embodiment of the present disclosure, the current state and the target state are motion data of two specific timing.

The primitive distribution is a basic unit of a specific action. A multiplicative composition with multiple primitive distributions and their corresponding primitive influences may generate a Gaussian distribution, and this Gaussian distribution is configured to control the robotic animal to perform an action like the target state or the current state.

Step S3 shows "selecting a current state of the reference animal from the motion data and setting an adapting state of the reference animal". Specifically, a part of the motion data at a specific timing is designated as the current state in the time range of the motion data. In response to the environment parameter and the disturbance parameter, a state of the reference animal is converted from the current state to the adapting state. For example, the reference animal's forward speed changes since it has to avoid falling objects in the environment. The adapting state is, for example, a sequence reflecting the aforementioned speed change.

Step S4 shows "generating a second primitive influence, by the policy network, according to the current state, the adapting state, and primitive distributions at least". Specifically, step S2 uses the gating network of the policy network to generate a first primitive influence, and step S4 also uses this gating network to generate the second primitive influence. The difference is that the parameters configured to train the gating network in step S4 further comprises the adapting state obtained based on the environment parameter.

Step S5 shows "training the policy network according to a comparison result between the first primitive influence and a second primitive influence by a discriminator". An embodiment of the present disclosure uses the discriminator of the generative adversarial network (GAN) framework to compare whether the first primitive influence and the second primitive influence are identical. Another embodiment of the present disclosure may use L1 distance or L2 distance together with maximal distance threshold to serve as the discriminator. If the similarity between the first and second primitive influences is in a specific range, the second primitive influences currently generated will be preserved. Otherwise, the present disclosure returns to step S4 and generates another second primitive influence by the gating network of the policy network.

The controller after the training flow of steps S1-S5 is available to control the robotic animal. An embodiment of the present disclosure further comprises step S6, "generating an action distribution according to the primitive distribution and the second primitive influence". Step S6 is configured to send an instruction controlling the robotic animal to perform a specific action by the well-trained controller.

In view of the above description, the method for training the locomotion controller of the robotic animal proposed by the present disclosure adding the augmentation parameters applicable to each of actuator models, robot mechanical limits, sensor noises, environmental change, inference engine delay, and microcontroller delay during the training process, and thereby training a robust controller. This controller is not only suitable for the virtual animal in character animation, but also can be directly integrated into the physical robotic animal, and high-level instructions are available to control the locomotion of the physical robotic animal.

What is claimed is:

1. A method for training a locomotion controller of a robotic animal comprising:
    obtaining a motion data of a reference animal, an environmental parameter, and a disturbance parameter;
    generating a plurality of primitive distributions and a first primitive influence according to the motion data by a policy network;
    selecting a current state of the reference animal from the motion data and set an adapting state of the reference animal;
    generating a second primitive influence, by the policy network, according to the current state, the adapting state, and the plurality of primitive distributions at least, wherein, in response to the environmental parameter and the disturbance parameter, a state of the reference animal is converted from the current state to the adapting state; and
    training the policy network according to a result determined by a discriminator according to the first primitive influence and the second primitive influence.

2. The method of claim 1, wherein the robotic animal has a plurality of joints, each of the plurality of joints has a motor and a proportional-derivative (PD) controller, and the disturbance parameter comprises a Gaussian noise applied on the PD controller.

3. The method of claim 2, wherein the disturbance parameter comprises an external force applied on one of the plurality of joints and a direction of the external force.

4. The method of claim 2, after training the policy network according to the result determined by the discriminator according to the first primitive influence and the second primitive influence, further comprising:
    generating an action distribution according to the plurality of primitive distributions and the second primitive influences, wherein the action distribution comprises an output momentum of one of the plurality of joints.

5. The method of claim 1, wherein the environment parameter set comprises a heightmap.

6. The method of claim 1, wherein the motion data comprises the current state and a historical state, the historical state is stored in an input queue, and after obtaining the motion data of the reference animal, the environmental parameter, and the disturbance parameter, the method further comprises:
    storing the current state in the input queue.

* * * * *